Aug. 27, 1968   G. W. PALUZZI   3,398,477
FISHHOOK LIVE BAIT HARNESS
Filed Jan. 26, 1967   2 Sheets-Sheet 1

INVENTOR
GUIRINO W. PALUZZI
BY
Royce E. Jones
AGENT

Aug. 27, 1968     G. W. PALUZZI     3,398,477

FISHHOOK LIVE BAIT HARNESS

Filed Jan. 26, 1967     2 Sheets-Sheet 2

INVENTOR
GUIRINO W. PALUZZI

BY Royce E. Jones

AGENT

United States Patent Office 3,398,477
Patented Aug. 27, 1968

3,398,477
FISHHOOK LIVE BAIT HARNESS
Guirino W. Paluzzi, 1200 Laurel Ave.,
Chesapeake, Va. 23325
Filed Jan. 26, 1967, Ser. No. 611,888
5 Claims. (Cl. 43—44.4)

ABSTRACT OF THE DISCLOSURE

A fishhook has a shank portion with an opening, in addition to the normal eye of the hook. A harness passes transversely through the opening and is frictionally adjustable therein.

This invention relates to fishhooks incorporating certain new and useful improvements therein for holding live bait to said hooks. Thus, one of the principal objects of this invention is to provide a live bait holding fishhook which is not injurious to the live bait, thereby keeping bait alive and natural looking.

Another object of this invention is to provide a hook with harness means with sufficient force to restrain the live bait without inhibiting its movement or actions and which will also prevent bait from being thrown off during casting or from being torn off by weeds and the like.

A further object of this invention is to provide a hook which makes the messy task of impaling live bait on a hook unnecessary.

Another object of this invention is to provide a fishhook which will keep the bait in one piece and will not require the barb of the hook to pass through the bait.

Yet another object is to provide a novel fishhook containing an adjustable live bait attaching means.

With these and other objects and advantages in view, as will be herein described, the invention relates to a unique structure which will be more fully described herein.

Figure 8:
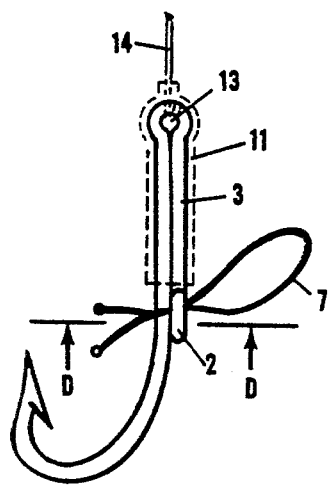
FIG. 8 is a side view of yet another embodiment of the invention wherein a bent-over portion of a hook is utilized.
Figure 8A:
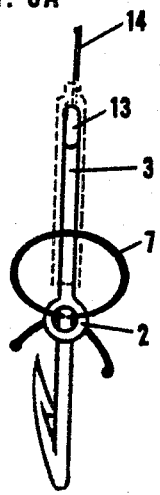

FIG. 8-A is a back view of FIG. 8.

Figure 9:
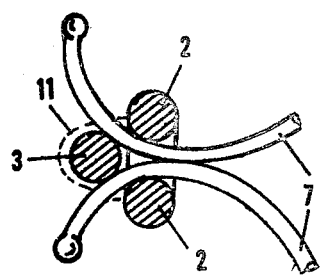

FIG. 9 is a cross-sectional view along the lines D—D of FIG. 8.

Figure 10:
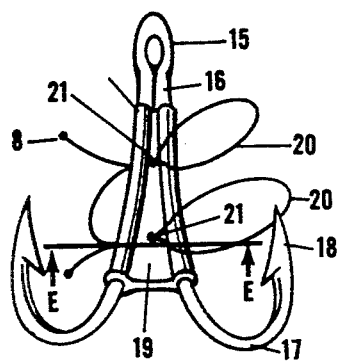

FIG. 10 is still another embodiment of the invention which utilizes a double-hook structure.

Figure 11:
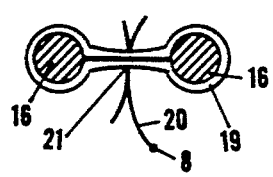

FIG. 11 is a cross-sectional view taken along the lines E—E of FIG. 10.

Figure 12:
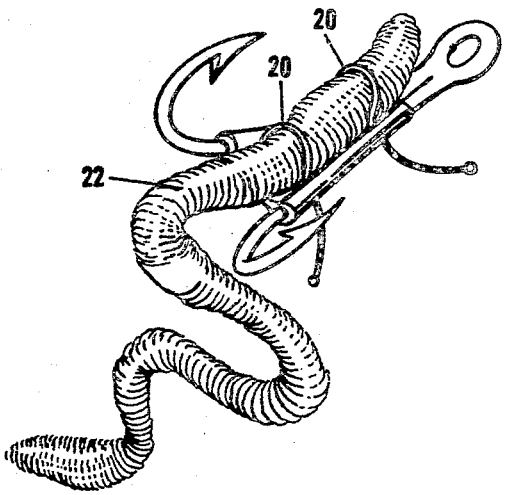

FIG. 12 is a view of the hook structure of FIG. 10 with bait securely held in place.

Referring now to the drawings wherein the different parts are indicated by different numbers, the invention is more fully defined.

Figure 1:
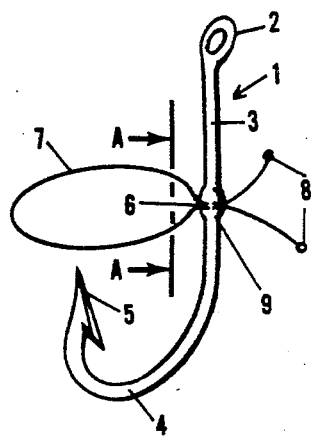
FIG. 1 is a view of one embodiment of the live bait holding fishhook structure.

In FIG. 1 a combination hook and live-bait securing means 1 is illustrated, said hook having an eye 2, shank 3, curved portion 4, barb 5, opening 6, and a harness 7 for securing live bait. The hook portions 2–5 are comprised of conventional materials while the harness is composed of a suitable material, preferably of resilient monofilament or woven nylon, pre-cut to the desired length. The harness 7 can be adjusted to restrain live bait to the hook by pulling either harness end 8 in order to obtain the desired pressure and to overcome the friction on the harness 7 at the opening 6. The friction of the harness 7 sliding against itself and against the side walls of the opening 6 keeps the harness securely in place.

The ends 8 of the harness 7 are enlarged in order to prevent the removal of the harness by normal adjustments thereto. These enlarged portions, preferably having diameters twice that of the harness material, are obtained by heating the ends of the nylon harness. The harness 7 is placed through the opening 6 by a needle threader type device or other means which will force the harness through the opening. The opening 6 has an enlarged shank portion 9 which strengthens the shank 3 at this point. This is deemed necessary in order to prevent the easy breakage of the shank 3 by weakening the structure with a hole and no support for said hole.

Figure 2:
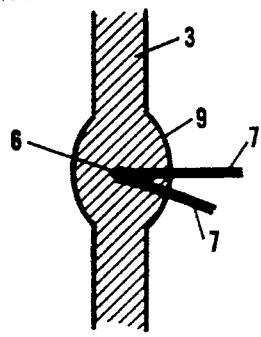
FIG. 2 is a cross-sectional view along the lines A—A of FIG. 1.

In FIG. 2 a better view of the opening 6 with harness 7 passing therethrough is illustrated.

Figure 3:
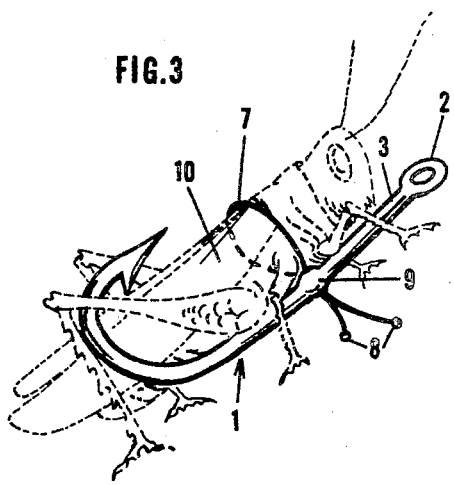
FIG. 3 is a side elevation of the live-bait holding device illustrating the relationship of the live bait to the hook.

In FIG. 3 live bait 10 is shown in place on the hook and securing means 1 of FIG. 1. The harness 7 is adjusted about the bait 10, in order to prevent the bait from slipping from the hook, by pulling on at least one end of the harness 8.

Figure 4:
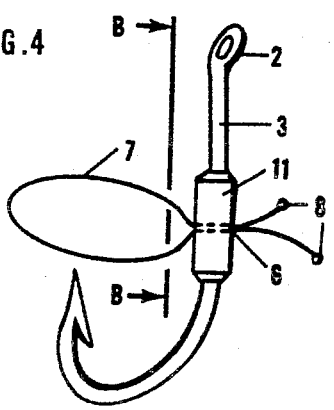
FIG. 4 is a view of another embodiment of the invention.

FIG. 4 illustrates a different embodiment of the invention wherein the eyelet shank 11 may be manufactured from metal or plastic material, preferably nylon or polyolefin. The eyelet shank 11 may be applied between the sheared portions of a standard hook by molding, bonding, brazing, or heat shrinking in order to provide room for opening 6 in order to facilitate fitting a harness structure 7. Irradiated semi-rigid or rigid polyolefin heat shrinkable tubing known as Heatrax is an excellent material for said eyelet shank 11. The sheared portions 12 of the hook shank 3 may be notched or grooved in order to better hold said eyelet shank in place.

Figure 5:
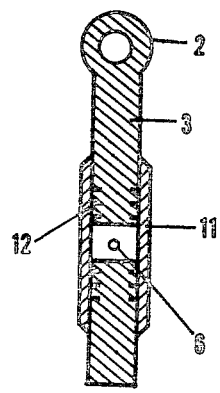
FIG. 5 is a cross-sectional view of the hook structure of FIG. 4 along the lines B—B thereof.

FIG. 5 is a partial view of FIG. 4, along the lines B—B thereof, in order to better show the tubing material 11 in position about said sheared portions 12 described above. In order to fit the harness structure to the hook of this figure, or any of the figures, a needle having a diameter smaller than that of the harness material may be used. The eye of the needle should be located just short of its point, similar to that of a sewing machine type. This needle is threaded with a thin, strong thread such as woven resilient nylon and is forced through the plastic material or tubing material 11. Once a loop is formed the harness 7 is inserted through the loop. The needle is then withdrawn, leaving the thin thread with the harness inserted. By pulling the thin thread the harness is force-fitted through the opening 6 through the heat shrinkable material 11.

Figure 6:
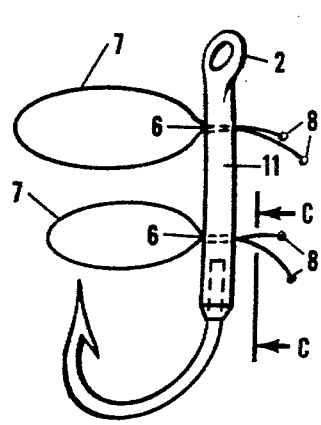
FIG. 6 is a view of another embodiment of the invention wherein more than one harness is employed.

FIG. 6 illustrates a slightly different embodiment of the invention wherein the shank 3 and eye 2 of the hook are formed from the heat shrinkable plastic tubing, solid plastic nylon or metal material 11 disclosed above. The sheared portion of the standard hook, is attached to the material 11 by shrinking said shrinkable tubing or molding, bonding, and brazing other suitable material as nylon and metal about said sheared portion. The openings 6 are made through said material 11 and the harness structure is fitted therethrough as described above or by other similar means.

Figure 7:
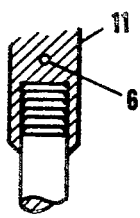
FIG. 7 is a cross-sectional view along the lines C—C of FIG. 6.

FIG. 7 is a cross-sectional view of a portion of FIG. 6 and better illustrates the connection of the material 11 to the sheared hook portion.

The hook structure of FIG. 8 is another embodiment of the invention wherein the long shank 3 of a hook is heated and bent back flush against itself, thereby forming an eyelet 13 for the leader 14. An extra long shank 3 is desirable for such an operation. If the eye 2 of the bent over portion is of the proper diameter the harness is fitted through said eye 2 and around the shank 3 as is better illustrated in FIG. 9. The portion of the hook structure above the eyelet 13 may be covered with the heat shrinkable tubing material disclosed above. This plastic shrinkable tubing material 11 which is fitted around the double shank may extend past the eyelet 13 and cover said eyelet. The portion about said eyelet 13 must be perforated in order to accommodate the leader 14. If the eye portion 2 is too large for the harness 7, a split plastic grommet, preferably nylon, or similar device may be inserted or force-fitted into said eye in order to accommodate said harness. Such an insert could be used in harness eyelet 2 or any of the hooks in order to reduce the size of said eye.

FIG. 10 illustrates a different embodiment of the invention containing a combination double hook and live bait securing means having an eye 15, shank 16, curved portions 17, barbs 18, cradle 19, and harness 20 for securing live bait. The cradle 19 may be manufactured from metal or plastic material, preferably from nylon or polyolefin heat shrinkable tubing material having a minimum shrinkage ratio of 2:1. The cradle 19 may be bonded or molded to the shank portions 16 or it may be pre-manufactured and force-fitted to the shank portions 16. A heat shrinkable plastic tubing material, disclosed in conjunction with FIG. 4 above, is an excellent material for such a cradle 19. Said tubing material 11 may be fitted down over the double hook member and heat shrunk into position. If metal is used for the cradle 19 the area between the shank portion 16 may be filled in by either brazing, molding, or casting.

The cradle 19 contains openings 21 which have a harness 20 passing through. The harness structure is similar to the harness 7 of FIG. 1 in both design and operation. The friction of the harness 20 sliding against itself and against the walls of the openings 21 keeps the harness and live bait in place. A double-loop harness 20 is made from the same materials as the harness 7.

A specially designed awl type needle with the needle eye open on one side to permit insertion and removal of harness may be used to install the harness 20 through openings 21 in cradle 19, or the awl type needle with inserted harness may be forced through the cradle, thus forming its own opening 21. The harness loop 20 is then removed from the awl's eye and the awl is withdrawn. Other means for inserting the harness 20 through openings 21 may be used. An example of such a method is that disclosed in conjunction with FIG. 5 above.

The harness 20 is controlled in the same manner as set forth for the harness 7 of FIG. 1. The use of a double-loop harness 20 provides for additional holding strength and for a more versatile hook structure.

FIG. 11 is a cross-sectional view of a portion of FIG. 10 along the line E—E thereof. The relationship of the cradle 19 to the hook shanks 16 and the harness 20 is illustrated.

FIG. 12 illustrates the double harness 20 of FIG. 10 as it appears in use about live bait 22. The tension on the harness 20 prevents the bait 22 from slipping off the hook and cradle portion.

The combination hook and live-bait securing means 1 may also be used for securing bait other than live bait. The harness numbers 7 and 20 may be drawn tightly about the bait and hold said bait in position during trolling or other uses.

Having thus described my invention, what I claim as new is:

1. A combination fishhook and live bait securing means comprising a fishhook having a shank portion, said shank portion containing an opening extending transversely therethrough in addition to the normal eye of the hook and a closed loop harness, said harness having a pair of runs extending through said opening and transversely of said shank portion for holding live bait to said hook, said harness being held rigidly in place by the friction of said runs against each other and against the side walls of said opening.

2. The structure according to claim 1 wherein the opening in addition to the normal eye is through an enlarged portion of the shank of the fishhook.

3. The structure according to claim 1 wherein the opening is through a heat shrunk plastic tubing attached to a sheared portion of said hook.

4. The structure according to claim 1 wherein said fish hook shank portion is bent on itself in order to form an additional line engaging eye so the normal eye may be used as the opening for said harness structure.

5. The structure according to claim 1 wherein said fishhook is a double-hook member and said opening is through a cradle rigidly held between the shanks of said double-hook member, said cradle having a second opening, said cradle being formed from plastic, said harness being a single line but comprising a double-loop design and passing through both said openings for securing live bait to said hook, and said harness having enlarged ends thereon for preventing the pulling of said harness through said openings.

References Cited

UNITED STATES PATENTS

| | | | |
|---|---|---|---|
| 1,062,726 | 5/1913 | Nelson | 43—44.4 |
| 2,598,011 | 5/1952 | Pitre | 43—44.4 X |
| 2,605,579 | 8/1952 | Chadwick | 43—44.4 |
| 2,982,049 | 5/1961 | Yost | 43—44.4 |

FOREIGN PATENTS

| | | |
|---|---|---|
| 96,177 | 2/1898 | Germany. |
| 4,129 | 1903 | Great Britain. |

ALDRICH F. MEDBERY, *Primary Examiner.*

J. H. CZERWONKY, *Assistant Examiner.*